United States Patent [19]

Kuck et al.

[11] 4,168,801

[45] Sep. 25, 1979

[54] DISCHARGE ASSEMBLY FOR LIQUID MANURE SPREADER

[75] Inventors: Jay L. Kuck, St. Marys; Neal C. Chamberlain, Celina, both of Ohio

[73] Assignee: Avco Corporation, Wilmington, Mass.

[21] Appl. No.: 903,087

[22] Filed: May 5, 1978

[51] Int. Cl.² .................... B05B 15/04; A01C 23/00
[52] U.S. Cl. ................................. 239/172; 239/524; 239/662
[58] Field of Search ............... 239/172, 518, 524, 662

[56] References Cited

U.S. PATENT DOCUMENTS

| 4,013,224 | 3/1977 | Carter | 239/172 X |
|---|---|---|---|
| 4,014,271 | 3/1977 | Rohlf | 239/172 X |

FOREIGN PATENT DOCUMENTS

| 256539 | 8/1967 | Austria | 239/172 |
|---|---|---|---|
| 675636 | 5/1966 | Belgium | 239/172 |
| 850081 | 9/1952 | Fed. Rep. of Germany | 239/524 |

Primary Examiner—Robert W. Saifer
Attorney, Agent, or Firm—Abraham Ogman; Robert J. McNair

[57] ABSTRACT

A liquid manure spreader uses a centrifugal pump to propel a slurry like product through a discharge assembly outward in a broad swath behind the spreader. The discharge assembly includes a plain nozzle having a contracting bore, a shaped deflector plate positioned in front of but at an angle with the end of the nozzle, and a guard plate for restricting the product discharge angle to less than 180 degrees. Structure is provided for evenly distributing the liquid manure in a swath about ten yards wide.

7 Claims, 9 Drawing Figures

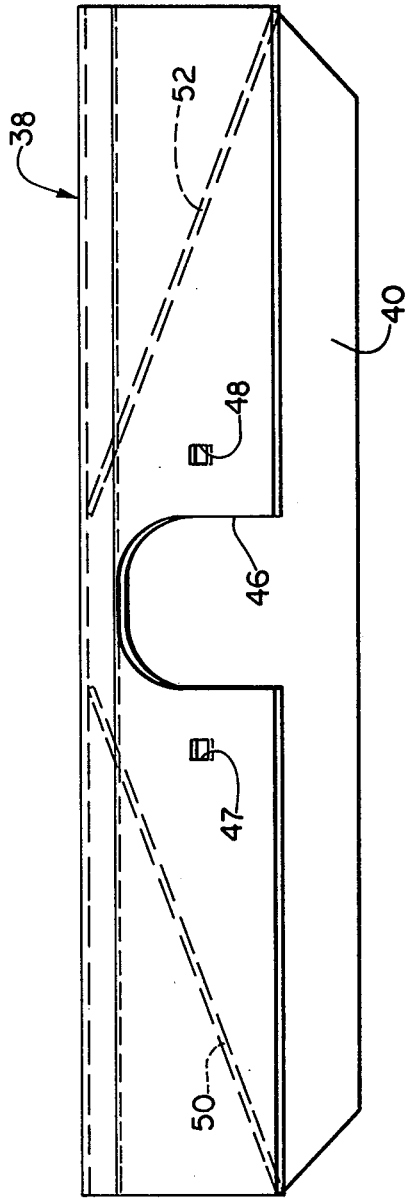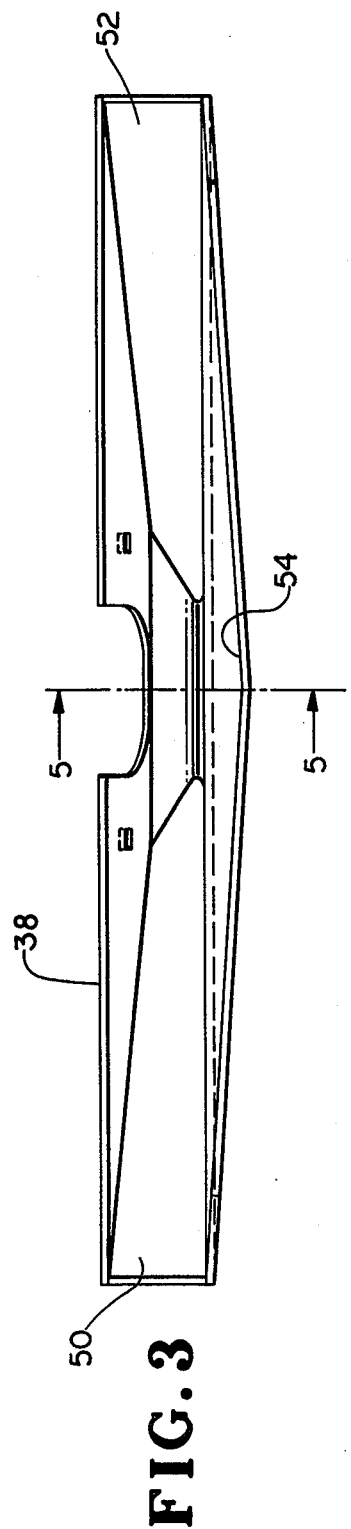
FIG. 4
FIG. 3

DISCHARGE ASSEMBLY FOR LIQUID MANURE SPREADER

BACKGROUND OF THE INVENTION

This invention relates to an improved discharge assembly for liquid manure spreaders. To be useful, a spreader of liquid manure must be able to handle a product containing solid vegetable waste material in the form of a thick slurry. Additionally, the liquid manure may include straw, grass and hay particles. It is important that the spreader distribute this slurry evenly on a field and that the spreading mechanism does not become clogged during use.

Several approaches have been tried. The U.S. Patent to Vaughn (U.S. Pat. No. 3,420,452) shows one approach. Vaughn discloses a cylindrical tank mounted on its side on a tractor drawn trailer chassis. The power takeoff from the tractor is coupled to a shaft which penetrates the front end of the tank near the bottom. The shaft runs the length of the tank leaving at the lower rear wall where it serves as the drive for a centrifugal pump. That portion of the shaft on the inside of the tank includes an auger shaped mechanism for continuously stirring the liquid manure slurry. The tank is filled by means of a hatch on the top of the tank. A discharge port near the bottom of the rear end wall of the tank allows liquid manure to enter the centrifugal pump. The blades of the impeller of the pump sweep liquid manure up along the side of the pump housing to a discharge aperature covered by an operator actuated gate valve. The liquid manure is ejected transversely of the path being followed by the tractor drawn spreader. The manure is flung by the impeller a considerable distance in an arc away from the aperture in the pump housing.

The U.S. Patent to Hodgson (U.S. Pat. No. 4,056,226) is an example of another type of liquid manure spreader. In the Hodgson system, the liquid maure slurry is carried in a mobile tank from which it may be discharged either through a nozzle or through soil injectors directly into the ground. The nozzle assembly includes a tubular body with a restricted end portion, plus a bracket upon which a nozzle closure is pivotally mounted. Pressure from a pump forces liquid against the pivotally mounted closure, causing it to swing outward and downward, thereby acting as a spray plate to spread the discharging liquid in a fan-like pattern about the nozzle.

Neither of the above spreaders provide the even distribution of liquid manure achieved with my invention. With my invention, liquid manure is discharged outwardly to the rear of the spreader in a fan-like pattern. By controlling the quantity of liquid discharged as a function of the angle off spreader centerline, the manure is spread evenly across the entire width of the path.

SUMMARY OF THE INVENTION

The object of this invention is to provide an improved discharge assembly for a large capacity, tank type liquid manure spreader. The main area of improvement concerns even spreading of the liquid manure slurry across a path of about 30 feet wide as the spreader is drawn through the field. Each trip through the field can be accomplished with this invention without need to overlap the previous area of coverage.

The discharge assembly is supplied from a centrifugal pump which is mounted on the bottom rear wall of a cylindrical holding tank. The tank is mounted on its side on a tractor drawn trailer chassis. The liquid manure slurry is propelled away from the centrifugal pump and through a section of pipe connected thereto. The pipe may or may not contain a cutoff valve. For the valveless case, the pipe contains a vertical run up to the top of the tank, a direction reversing bend and a second vertical run down to a termination point about midway down the tank. In the other version a straight section of pipe with a valve mechanism included therein is attached to the exhaust port of the pump. The pipe section is only a few feet long and makes a vertical run upward to a termination point at a mid-tank location. The discharge assembly operates equally well when joined to either an upward or a downward pointing pipe end.

The discharge assembly is comprised of three parts. There is a plain nozzle attached to the end of the pipe which conveys the slurry away from the centrifugal pump. Spaced away from the open end of the nozzle a short distance and at a small angle thereto is a deflector plate. The deflector plate is not flat as is the case with previous art teachings. Rather the face of the plate is symmetrically curved about its centerline. The rear edge of the deflector plate is bent upward and has a notch removed therefrom so that the plate can be integrally attached to the outside periphery of the nozzle. Between the upward bent rear portion of the deflector plate and the nozzle end there is a guard plate which restricts the discharge angle of the liquid manure to less than 180 degrees. Orientation of the discharge assembly is such that the liquid manure sprays outward in a horizontal sheet covering an angle of approximately 150 degrees. The horizontal, fan shaped stream emitted by the discharge assembly is pulled downward by gravity, so that the liquid strikes the ground in a circular arc to the rear of the spreader. The radius of this arc measured approximately 15 feet in the unit reduced to practice. The geometrical relationship between the open end of the nozzle and the deflector plate is such that the liquid is evenly distributed across the entire width of the path covered by the tractor drawn spreader as it traverses the field.

BRIEF DESCRIPTION OF THE DRAWINGS

FIG. 3 is a front view of the deflector plate showing the guard plates in position.

FIG. 4 is a top view of the deflector plate.

DESCRIPTION OF THE PREFERRED EMBODIMENT

Figure 1:
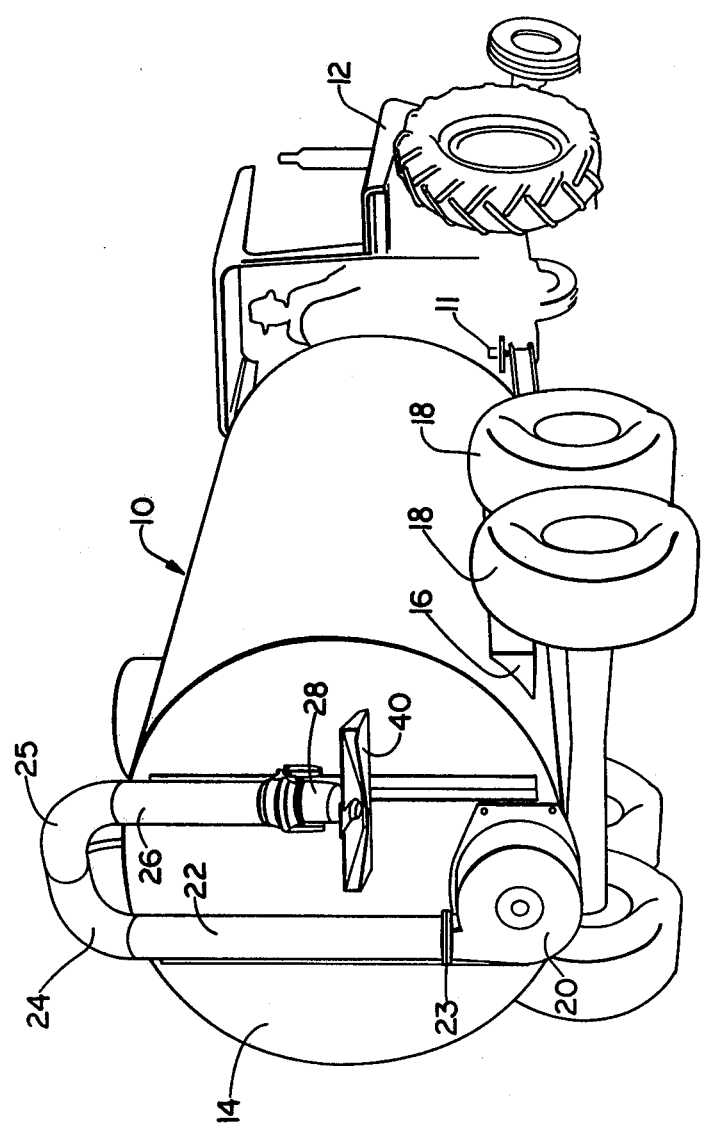
FIG. 1 is an isometric view of a tractor drawn liquid manure spreader having a discharge assembly containing the invention.

Referring to FIG. 1 there is shown a liquid manure spreader 10 attached by means of a drawbar hitch 11 to a tractor 12. Spreader 10 has a cylindrical holding tank 14, mounted on a chassis 16 which is carried on tandem wheels 18. Mounted near the bottom of the rear wall of tank 14 is a centrifugal pump 20. Pump 20 is powered from the power-takeoff of tractor 12 by a shaft which extends the length of the cylindrical tank 14. The casing of pump 20 communicates with the inside of tank 14 by means of a port through the rear wall of the tank.

Pipe 22 is attached to the discharge port 23 of the pump casing. Pipe 22 includes a vertical run to the top of the tank, two 90 degree bends 24 and 25, then a second vertically oriented pipe section 26. About midway down the tank, pipe section 26 joins the discharge assembly, indicated generally at 28. The vertical run of pipe 22 to the top of tank 14 prevents liquid manure from flowing out of the pump when the tank is full. Arranged as shown in FIG. 1, it takes power from pump 20 to force manure out of the tank.

Figure 2:
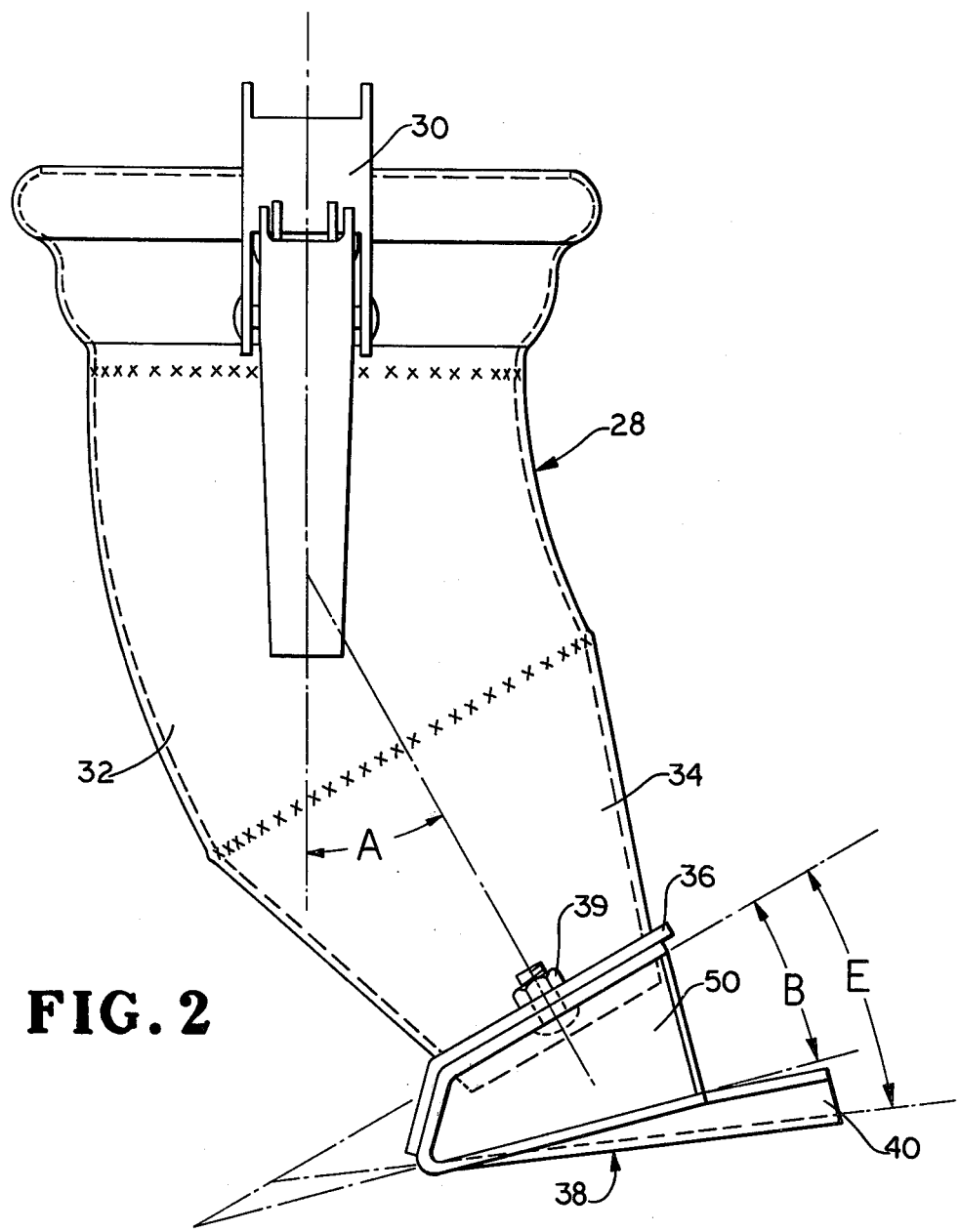
FIG. 2 is a side view of the discharge assembly showing the relationship between the nozzle and the deflector plate.

FIG. 2 shows a side view of discharge assembly 28. A snap action clamp 30 allows easy disconnection of discharge assembly 28 from the end of pipe section 26. Discharge assembly 28 includes an elbow section 32 which in the unit reduced to practice, changed the direction of flow by an angle A of 30 degrees. The elbow terminates at a plain convergent nozzle 34. Attached near the discharge end of nozzle 34, as by welding, is a rectangular flange 36 having a circular section removed therefrom which allows the flange to be slipped over the end of the nozzle. Flange 36 provides a means for attaching the deflector assembly 38. Attachment is shown as being accomplished by bolt 39.

Figure 5:
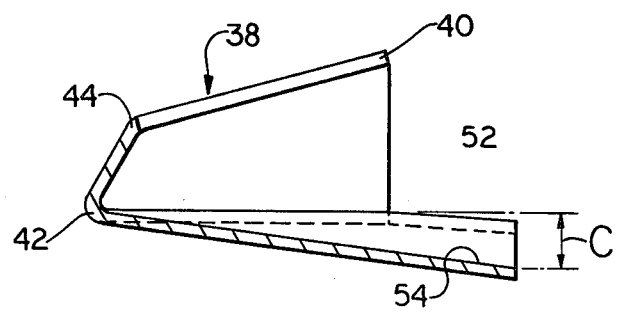
FIG. 5 is an end view of the deflector plate taken along line 5—5 of FIG. 3.

FIG. 3 shows a front view of the deflector assembly 38 while FIG. 4 shows a top view. FIG. 5 shows an end view taken along cut 5—5 of FIG. 3. The deflector assembly is comprised of 3 parts. There is a large rectangular main section 40 having two bends 42 and 44. A notch 46 removed from the top midsection allows the deflector to be attached to flange 36 (See FIG. 2) by bolts 39 inserted in holes 47 and 48. Bends 42 and 44, in combination, establish the spacing and angle between the discharge end of nozzle 34 and the opposing face of the deflector plate. In the unit reduced to practice, angle B (See FIG. 2) amounted to 15 degrees.

Tapered spacer sections 50 and 52 are attached as by welding in the positions shown in FIGS. 3 and 4. Spacer sections 50 and 52 perform a dual function. Firstly, they serve to hold the upper and lower faces of the rectangular main section at the pre-established angle B (See FIG. 2). Second, spacer sections 50 and 52 establish the angular limits beyond which the liquid manure cannnot spray out, forming thereby a pair of guard plates.

In FIGS. 3 and 5, it will be noted that face 54 is shaped in a special way. As shown in FIG. 3, the center of face 54 is depressed from the horizontal by an amount C. In the unit reduced to practice, dimension C measured about seven eights of an inch.

Figure 6:
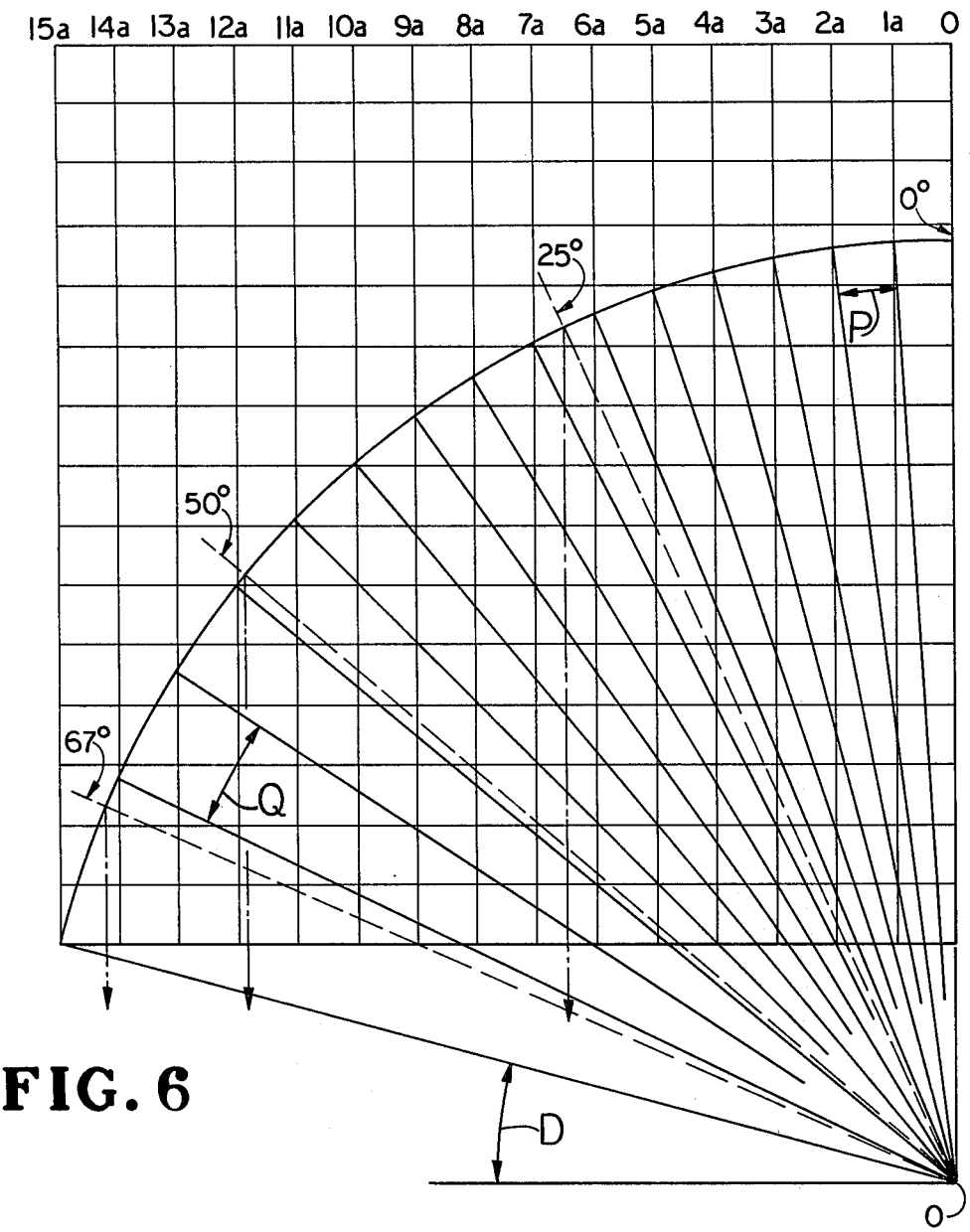
FIG. 6 is a plot of the left half top view of the spray angle from the discharge assembly containing the invention.

The effect produced by depressing face 54 at the center by the dimension C is basic to our invention. What needs to be accomplished by the discharge assembly is shown in FIG. 6. Facing rearward from the rear wall of the spreader tank, the left quadrant of liquid spraying out from the discharge assembly 28, will appear generally as shown in FIG. 6. Point 0 represents the origin at the center of discharge assembly 28. The liquid manure slurry sprays out in an arc covering a wide swath behind the spreader. It will be understood that the liquid sprays out both left and right and that the right half is symmetrical to the left quadrant shown in FIG. 6.

Figure 7:
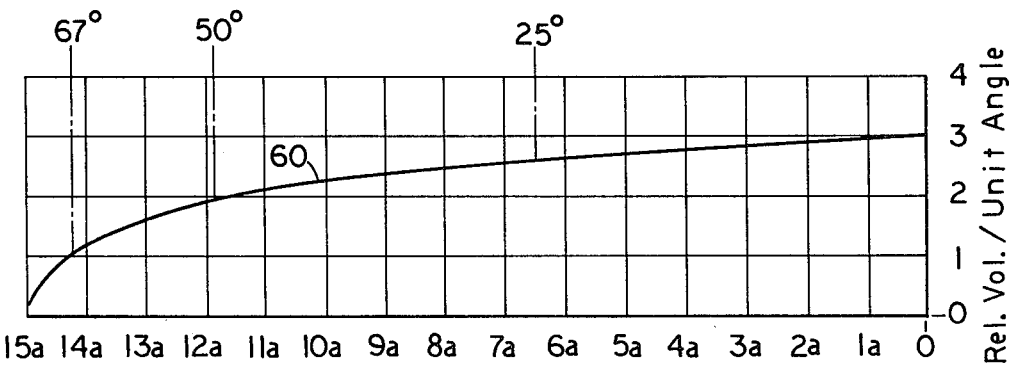
FIG. 7 is a plot of slurry volume per unit angle versus position of ground contact for achieving the distribution shown in FIG. 6.
Figure 8:
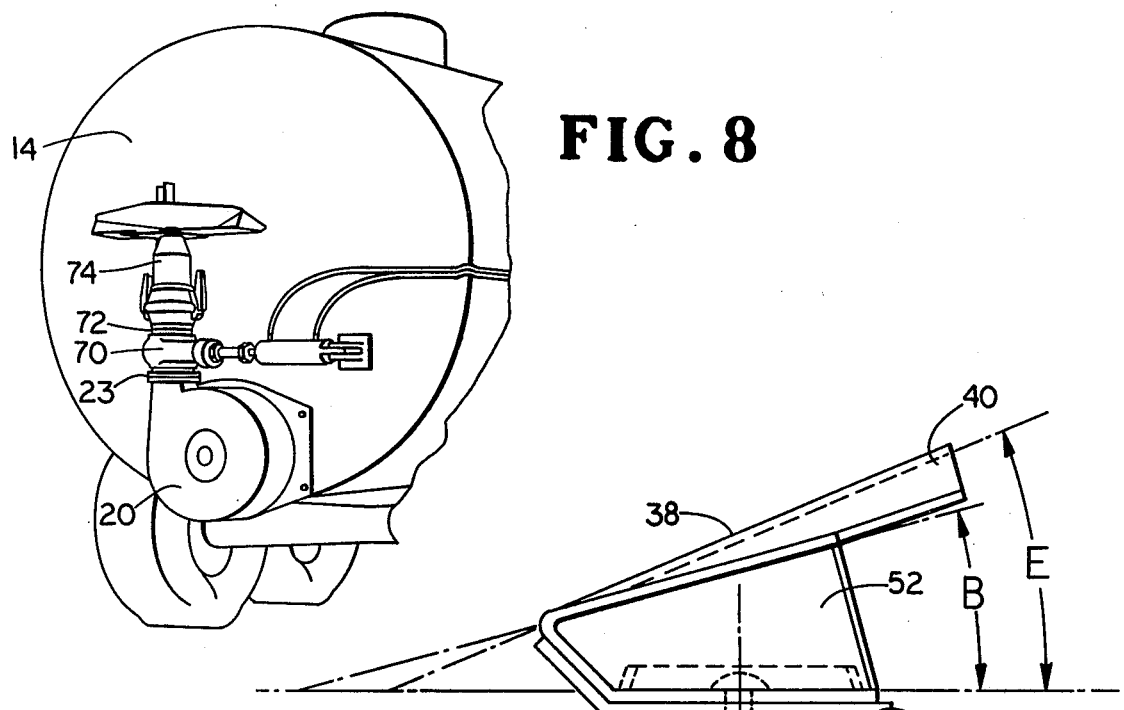
FIG. 8 is an isometric view of an alternate implementation of the discharge assembly.
Figure 9:
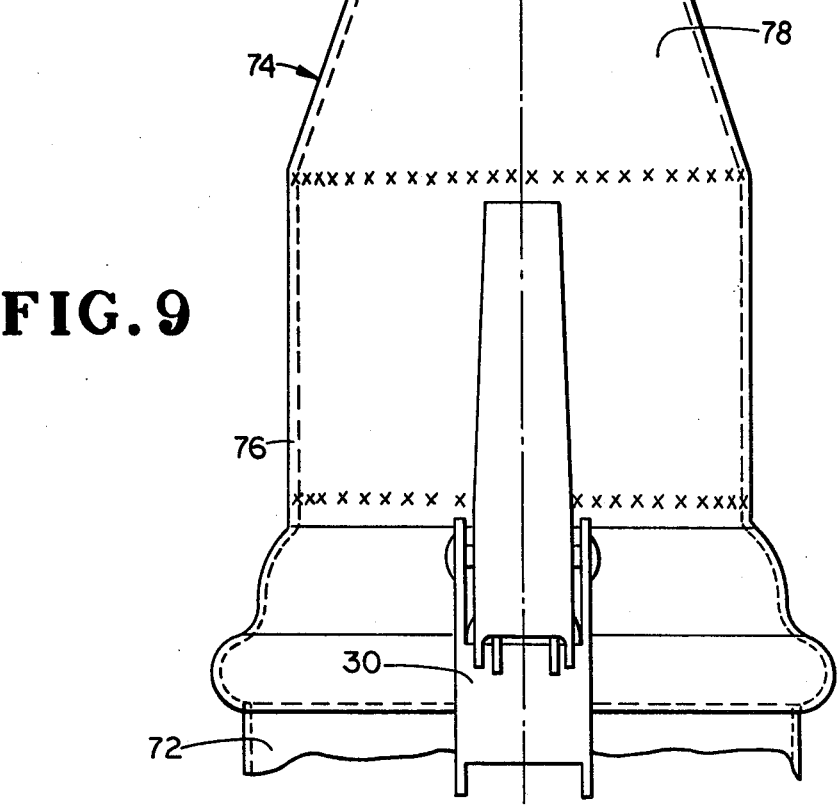
FIG. 9 is a side view of the disharge assembly configurated for installation of the FIG. 8 implementation.

The goal is to distribute the liquid manure evenly across the width of the swath being covered. To do this means that an equal amount of liquid must strike the ground in both the region 1a to 2a and 13a to 14a. Study of FIG. 6 shows that the angle P subtended between lines 1a and 2a is much smaller than the angle Q subtended between lines 13a and 14a. Stated in terms of relative volume per unit angle versus angle of ejection from the discharge assembly, what is needed is to have a higher concentration directly behind the spreader than is going off at an angle. FIG. 7 shows a plot of relative volume per unit angle versus angle of discharge. Curve 60 shows that the relative volume per unit angle versus angle of discharge varies from a value of 3 at zero offset to about one at an offset angle of 70 degrees. As shown by angle D in FIG. 6, there is no liquid manure discharged in this region. For the unit reduced to practice, angle D measured 15 degrees. Tapered plate 52 (See FIG. 5) prevents discharge of any liquid manure at these high angles of offset.

The shaping of the lower face 54 of main deflector assembly 40 controls the amount of liquid being dispensed. By depressing the center of face 54 with respect to the edges, more liquid manure is concentrated at the center of the jet. Curve 60 shows that relative volume per unit angle smoothly decreases as the angle of offset from center increases. Thus, the depression of face 54 can also taper smoothly out to the edges. FIG. 2 shows that the included angle B between the outer edges of main deflector assembly 40 is measurably smaller than included angle E taken at the lower most point; this point being coincident with cut 5—5 of FIG. 3.

Study of FIG. 7 shows that curve 60 approximates a cosine function wherein the angle involved is the number of degrees away from directly behind the spreader. To achieve this sort of a function requires adjusting the spacing between the end of nozzle 34 and surface 54. This is accomplished by establishing a schedule of the progression between angle B (See FIG. 2) and angle E at the midpoint of the discharge assembly. Angle B must be such that very little fluid is discharged at the maximum offset angle (75 degrees in the exemplary system). Angle E, achieved by depressing surface 54 by an amount C, being greater than angle B increases the flow of liquid at small offset angles, maximizing flow at zero degrees. The rate of taper in surface 54 as it progresses from angle B at the edge to angle E at the center dominates the shape of curve 60 in FIG. 7. In the unit reduced to practice a linear taper was found to provide a close approximation to the desired theoretical curve. Reference to FIGS. 6 and 7 shows the relative volume of slurry dispensed per unit angle for specific offset angles as follows:

zero degrees—3.00
25 degrees—2.60
50 degrees—1.95
67 degrees—1.00

By using plates 50 and 52 to restrict the angle of horizontal discharge to an angle of about 150 degrees, the rear of the spreader is kept clean. All of the manure is discharged out into the clear and none impinges on protruding parts of the spreader. There is a parallel orientation of main deflector assembly 40 with respect to the ground (See FIG. 1). Maintaining the side to side basis of the main deflector assembly parallel to the ground assures that liquid is sprayed out equal distances left and right. This is important since gravitational pull on the discharged particles causes all of them to hit the ground at the same time if the discharge is originally fanned out parallel to the ground.

The combination of elbow offset Angle A (See FIG. 2), deflection plate to nozzle spacing together with offset angle B and center depression angle E all combine to define both the front to back angle of discharge plus the needed concentration of liquid along the center of the path of travel.

The discharge assembly itself has no valves or moving parts to malfunction. With the FIG. 1 implementation, no valves are needed anywhere. By having pipe 22, 24, 25 and 26 loop up to the top of tank 14 and back, the liquid slurry does not tend to flow out during the transport of the manure from feedlot to field. For the FIG. 1 implementation the discharge assembly attaches to a generally downward pointing pipe.

An alternate implementation of the discharge assembly is shown in FIG. 8. There, the rear wall of cylindrical holding tank 14 carries a centrifugal pump 20. The discharge port 23 of the pump is attached to a hydraulically actuated gate valve 70. The outlet side of gate valve 70 attaches to a short section of vertially orientd pipe 72. The upwarding pointing outlet end of pipe 72 connects to the inlet of the discharge assembly indicated generally at 74. Closure of gate valve 70 prevents liquid manure from flowing out of the discharge assembly when the tank is full.

FIG. 9 shows a side view of this alternate implementation of the discharge assembly. A snap action clamp 30 allows easy disconnection of discharge assembly 74 from the end of pipe section 72. Discharge assembly 74 includes a short straight section of pipe 76 which terminates at a plain convergent nozzle 78. Nozzle 78 of FIG. 9 is identical with nozzle 34 of FIG. 2. Actually, the only difference between the discharge assembly 28 of FIG. 2 and the discharge assembly 74 of FIG. 9 has to do with elbow 32 of FIG. 2 and straight pipe section 76 of FIG. 9. Since all other parts are identical, they will be so nomenclatured in FIG. 9.

Attached near the discharge end of nozzle 78, as by welding, is a rectangular flange 36 having a circular section removed therefrom which allows the flange to be slipped over the end of the nozzle. Flange 36 provides a means for attaching the deflector assembly 38. Attachment is shown as being accomplished by bolt 39. In the unit reduced to practice, angle B amounted to 15 degrees and angle E at the center of main deflector section 40 was about 22 degrees. Tapered spacer section 52 which can be viewed best in FIGS. 3 and 4 serves the same dual function as previously described, namely; it, in combination with its companion, section 50, holds the faces of the main deflector section 40 at the pre-established angle B and also acts as a guard plate to limit the angle of liquid discharge.

The deflector assembly shown in FIGS. 3 and 4 and previously described, is used one side up when implemented as per FIG. 1 and the other side up when implemented as shown in FIG. 8. In both implementations, the liquid slurry is deflected off a surface which is tilted upward with respect to the horizontal. For the downward pointing pipe of FIG. 1, the curvature in elbow 32 (See FIG. 2) determines the upward tilt for the deflector surface. For the upward pointing pipe of FIG. 8, the use of straight pipe section 76 determines the upward tilt of the deflector section. In both implementations the 15 degree upward tilt at the outer edges of the inner surface of the deflector section was found to provide good horizontal dispensation of the liquid slurry. Horizontal distribution is needed so that the liquid strikes the ground in a large circular arc at the rear of the spreader.

This invention provides a discharge assembly suited for use with any slurry like product which is to be evenly deposited across a wide swath. It is simple in construction and eliminates the problems associated with spreading fibrous slurry substances. No unnecessary limitations are to be construed from the foregoing description which is given only for clearness of understanding. Modifications will be obvious to those skilled in the art.

We claim:

1. Apparatus for evenly distributing a liquid slurry transversely along a path being traversed by a mobile spreader having a storage tank thereon, said spreader including means for delivering the liquid slurry under pressure to the distributing apparatus via a pipe, said apparatus comprising:

a plain nozzle having a contracting bore, said nozzle being attached at its input end to the output end of said pipe, the output end of said nozzle being oriented for discharging the liquid slurry in a generally vertical direction;

a deflector plate attached in a fixed relationship to the periphery of said nozzle, said deflector being spaced away from the open end of said nozzle a short distance and at a small angle thereto, the surface of said deflector plate being symmetrically curved about its centerline, said centerline being oriented so as to be parallel with the centerline of said mobile spreader, the orientation and relationship between the top surface of said deflector plate and the open end of said nozzle being such that the liquid slurry is discharged in a fan shaped generally horizontal arc, the included angle between the deflector plate and the end of said nozzle being greater at the centerline of said deflector plate than is the included angle at off-center orientations whereby the concentration of liquid slurry is greatest at the center being reduced as a function of the angle of offset from the centerline, thereby resulting in an even distribution of liquid slurry across the entire width of the path being covered; and a guard plate restricting discharge of the liquid slurry to horizontal angles of less than 180 degrees, said guard plate being attached to said deflector plate near its junction with the periphery of said nozzle.

2. The invention described in claim 1 wherein the guard plate restricts the discharge angle to 150 degrees.

3. The invention as described in claim 1 and including a connecting section between the output end of said pipe and the input end of said nozzle, said section serving as a direction changing elbow to orient the centerline of said nozzle at specified angles with respect to the centerline alignment of said pipe.

4. The invention as described in claim 3 wherein the minimum included angle between the end of said nozzle and the top surface of said deflector plate is 15 degrees.

5. The invention as described in claim 4 wherein the connecting section is an elbow serving to provide a 30 degree shift in the centerline alignment of said nozzle with respect to said pipe whereby the discharge assembly spreads liquid slurry delivered through a downward pointing pipe.

6. The invention as described in claim 4 wherein the connecting section is a short straight section serving to maintain the centerline of said nozzle in alignment with the centerline of said pipe whereby the discharge assembly spreads liquid slurry delivered through an upward pointing vertically oriented pipe.

7. The invention as defined in claim 1 wherein the surface of the deflector plate is curved symmetrically about its centerline establishing thereby a decreasing included angle with the open end of said nozzle at off-centerline radials, the change in included angle between the open end of said nozzle and said deflector plate varying as a linear taper to provide slurry dispensation per unit angle for angles offset from center according to the following schedule of relative volumes: zero degree offset—3.00, 25 degree offset—2.60, 50 degree offset—1.95, and 67 degree offset—1.00.

* * * * *